(12) United States Patent
Emori (10) Patent No.: US 6,927,896 B2
(45) Date of Patent: Aug. 9, 2005

(54) RAMAN OPTICAL AMPLIFICATION SYSTEM

(75) Inventor: Yoshihiro Emori, Tokyo (JP)

(73) Assignee: The Furukawa Electric Company, Ltd., Tokyo (JP)

(*) Notice: Subject to any disclaimer, the term of this patent is extended or adjusted under 35 U.S.C. 154(b) by 10 days.

(21) Appl. No.: 10/193,239

(22) Filed: Jul. 12, 2002

(65) Prior Publication Data

US 2003/0025988 A1 Feb. 6, 2003

(30) Foreign Application Priority Data

| Jul. 13, 2001 | (JP) | ................................. 2001-214397 |
| Jul. 8, 2002 | (JP) | ................................. 2002-199115 |

(51) Int. Cl.[7] ................................................ H01S 3/00
(52) U.S. Cl. ................................. 359/334; 359/341.31
(58) Field of Search ............................. 359/334, 341.31

(56) References Cited

U.S. PATENT DOCUMENTS

| 6,292,288 B1 | * | 9/2001 | Akasaka et al. | ............. | 359/334 |
| 6,424,455 B1 | * | 7/2002 | Dmitri | ......................... | 359/334 |
| 6,532,101 B2 | * | 3/2003 | Islam et al. | ................. | 359/334 |
| 6,785,042 B1 | * | 8/2004 | Onaka et al. | ............... | 359/334 |

FOREIGN PATENT DOCUMENTS

| EP | 1 018 666 | 7/2000 | ............. G02F/1/35 |
| EP | 1 102 114 | 5/2001 | ............. G02F/1/35 |
| EP | 1 170 628 | 1/2002 | ............. G02F/1/35 |
| EP | 1 182 808 | 2/2002 | ............. H04B/10/17 |
| EP | 1 187 276 | 3/2002 | ............. H01S/3/30 |
| WO | WO 00 49721 | 8/2000 | |

OTHER PUBLICATIONS

Agrawal, Govind P. Fiber–Optic Communication Systems. John Wiley & Sons, Inc. 1997. p. 380.*

Unrau, U.B. Specialty Fibers for Optical Amplifiers in Communications. Transparent Optical Networks, 2001, Proceeding in 2001 3rd International Conference. Jun. 18–21, 2001, pp. 26–27.*

* cited by examiner

Primary Examiner—Bernarr E. Gregory
Assistant Examiner—Deandra M. Hughes
(74) Attorney, Agent, or Firm—Oblon, Spivak, McClelland, Maier & Neustadt, P.C.

(57) ABSTRACT

In a Raman optical amplification system in which WDM optical signals comprising two or more signal bands are transmitted in a transmission line, and in which a plurality of pumping lightwaves are introduced into said transmission line so that WDM optical signals in the shortest signal band are Raman-amplified by said plurality of pumping lightwaves, the interval between the longest pumping wavelength and the next-longest pumping wavelength differs by 0.2 to 1.4 THz in frequency. This makes it possible to flatten the level of the WDM signals by means of canceling the Raman gain ripple on the longer wavelength region of the distributed amplification.

9 Claims, 8 Drawing Sheets

RAMAN OPTICAL AMPLIFICATION SYSTEM

TECHNICAL FIELD

The present invention relates to Raman optical amplification suitable for use, for example, in a WDM system.

BACKGROUND ART

Figures 6A, 6B, 6C, 6D:
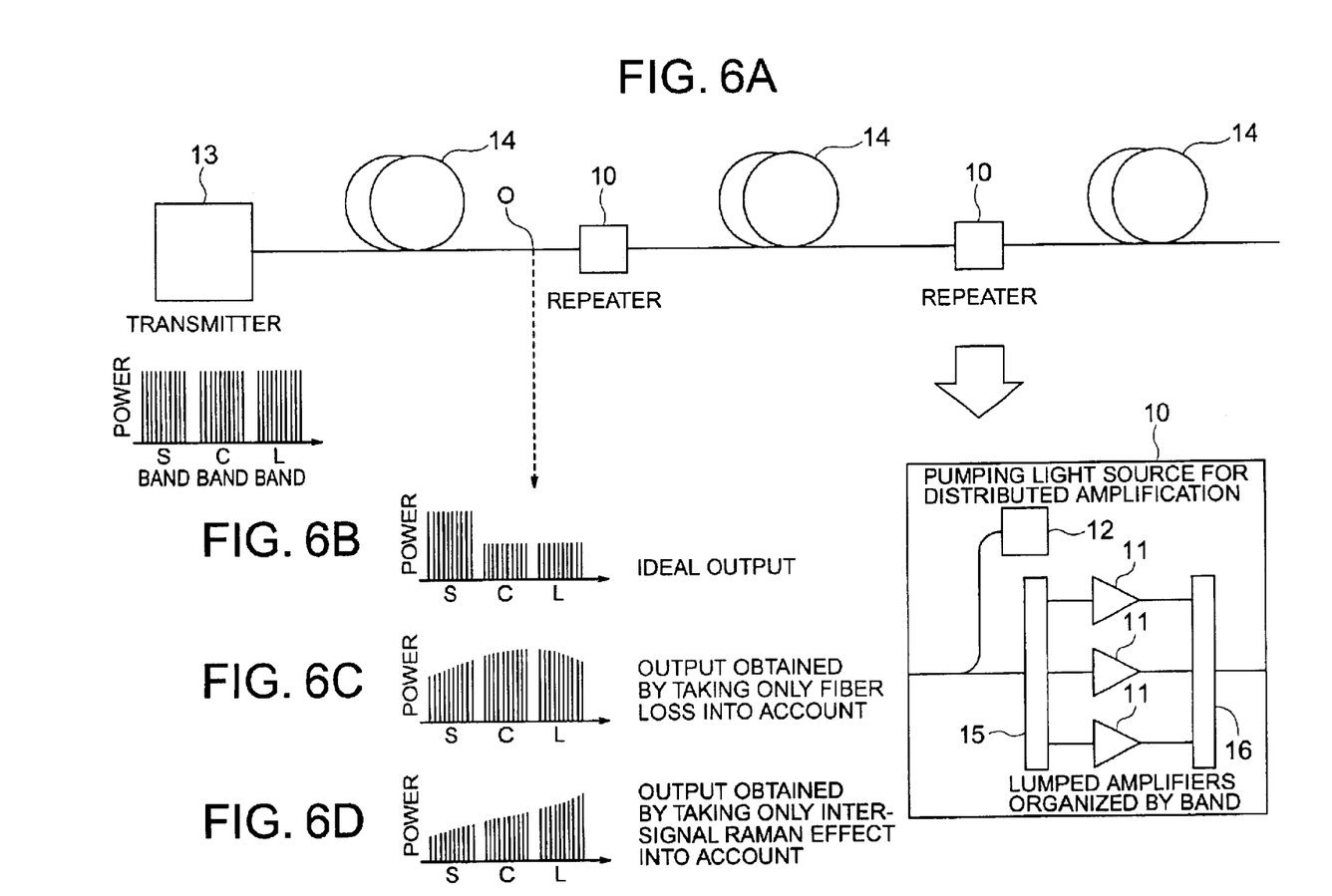
FIG. 6A is a diagram illustrating a conventional WDM transmission system.
FIG. 6B is a diagram illustrating an ideal output level in three-band transmission using the WDM transmission system of FIG. 6A.
FIG. 6C is a diagram illustrating an output level obtained by taking only fiber loss into account in three-band transmission.
FIG. 6D is a diagram illustrating an output level obtained by taking only inter-signal Raman effect into account in three-band transmission.

In recent years, a spread of transactions across the Internet has led to a rapid increase in information transmission amount. Also in other fields, there has been an increase in information transmission amount. With the increase in information transmission amount, there is a demand for large transmission capacity and high density of transmission systems. In view of the above, in a WDM transmission system (wavelength division multiplexing transmission system), the transmission band has been expanded from C-band (1530 to 1560 nm) to L-band (1560 to 1620 nm), and further, to S-band (1475 to 1510 nm). FIG. 6A shows an example of a WDM transmission system. In this WDM transmission system, lumped amplifiers 11 for respective bands are used in repeaters 10, each of which contains a pumping light source 12 for distributed amplification.

A WDM optical signal transmitted from a transmitter 13 of the WDM transmission system of FIG. 6A undergoes Raman amplification by optical fiber amplifiers 14 using a transmission line as the amplification medium, and optical amplification by the repeaters 10. In this case, the WDM optical signal input to each repeater 10 is demultiplexed by a demultiplexer 15, amplified by the optical amplifiers 11 which are contained in each repeater 10 and adapted to operate for the different bands, and multiplexed by a multiplexer 16 before being output. Prior to this amplification, the WDM optical signal undergoes Raman amplification by the optical fiber amplifiers 14 using the transmission line as the amplification medium by means of pumping lightwave from the pumping light source 12 for distributed amplification of the repeater 10.

Figure 7:
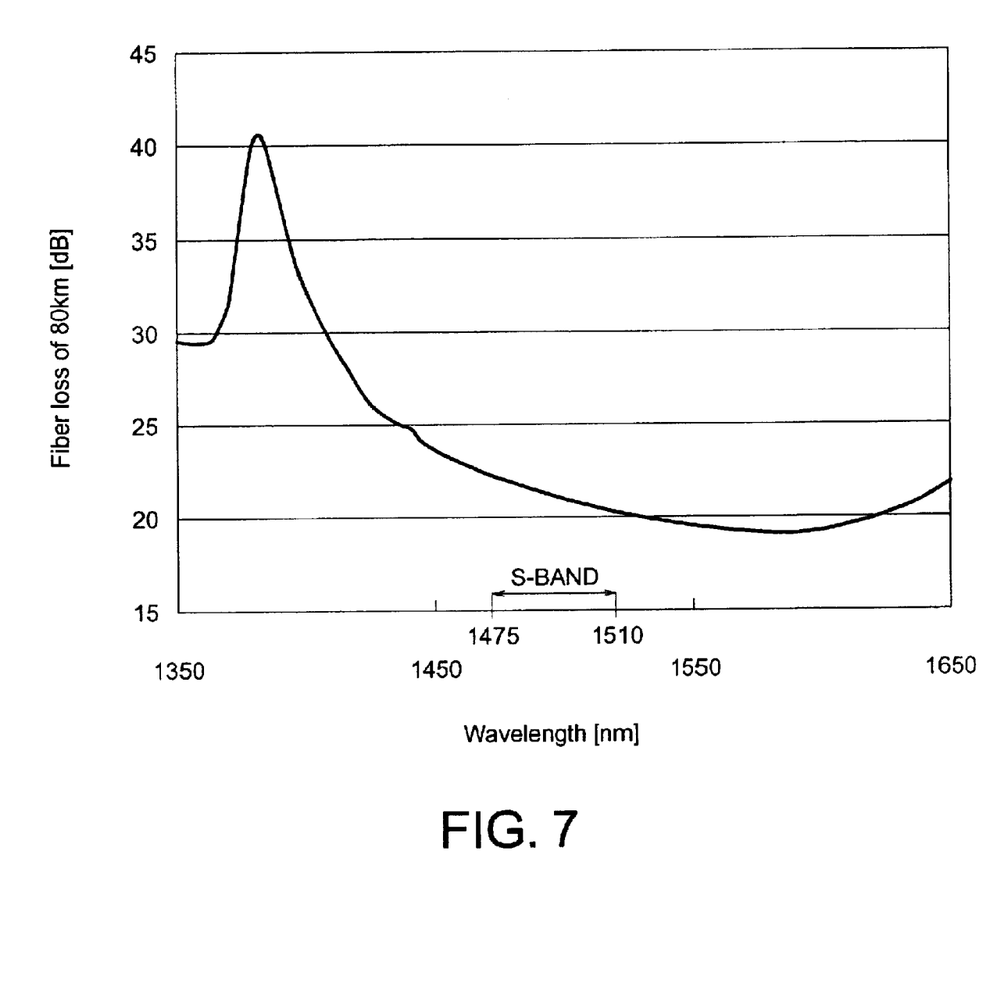
FIG. 7 is a diagram illustrating a wavelength property of fiber loss when a WDM optical signal is transmitted through an optical fiber having a length of 80 km.

When transmitting WDM optical signals of the three bands: S-band, C-band, and L-band, from the transmitter 13 of FIG. 6A, these optical signals are ideally output from the repeaters 10 without changing the optical level at which they are input to the transmission line; actually, however, a deviation in output level is generated due to the wavelength dependency of fiber loss, inter-signal Raman effect, and characteristics of the lumped amplifiers. In particular, the deficiency in power of the S-band signal is conspicuous. The inter-signal Raman effect means energy loss of short-wavelength light due to transferring the energy to the long-wavelength light via Raman amplification. The WDM optical signal is subjected to fiber loss as shown FIG. 7 when a WDM optical signal is transmitted through an optical fiber having a length of 80 km. FIG. 6B shows an example of an ideal WDM output at point O in FIG. 6A (in front of the repeater 10); FIG. 6C shows an example of a WDM output obtained by taking into account solely the fiber loss; and FIG. 6D shows an example of a WDM output obtained by taking into account solely the inter-signal Raman effect. Here, it is assumed that the lumped amplifier gain for S-band is smaller than those for C-band and L-band.

According to a three-band transmission method, the input level of the S-band optical signal is made higher than the input level in the other bands to thereby compensate for the deficiency in power of the S-band signal and equalize the output levels of the signals of the three bands. Apart from this, there is a method according to which a distributed Raman amplifier is used in the repeater, solely the S-band signal being amplified by the distributed Raman amplifier.

Figure 8:
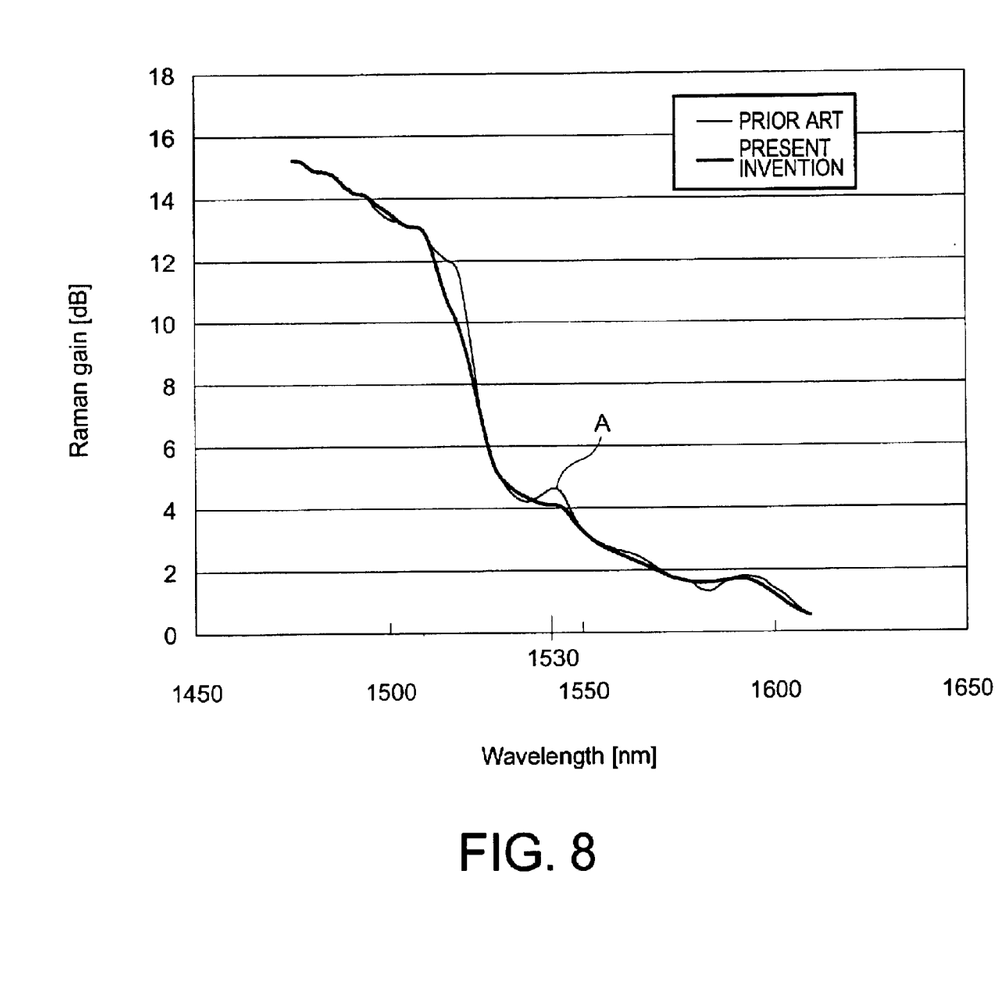
FIG. 8 is a diagram illustrating how a gain ripple is generated on a long-wavelength band side with respect to the wavelength band for which the pumping wavelength is optimized when using a distributed Raman amplifier.

In a WDM transmission system using a distributed Raman amplifier in the repeater, designing the pumping wavelength with only the flatness at the wavelength band giving maximum gain (e.g., S-band) in mind may result in generation of a gain ripple A on a long-wavelength band side (i.e., C-band) with respect to the wavelength band for which the pumping wavelength is optimized, as shown in FIG. 8. The ripple A of FIG. 8 is at a wavelength of 1530 nm, which is the peak of gain obtained by pumping lightwave of a wavelength of 1413 nm. When an optical signal of a band (C-band) with the ripple A is used at the same time, the flatness of the signal level is adversely affected.

SUMMARY OF THE INVENTION

In WDM signal transmission, to obtain a flat output from the optical amplifier forming the repeater, it is desirable to input a WDM signal of a flat level to the optical amplifier. For that purpose, it is desirable to impart to the WDM signal such a Raman gain as will cancel the inter-signal Raman effect and the wavelength dependency of the fiber loss, thereby making the level of the WDM signal input to the optical amplifier flat. The Raman optical amplification system of the present invention is designed to cancel the ripple generated on the long-wavelength signal band side by the distributed Raman amplification gain given to the short-wavelength signal band side. To achieve this, the following construction is adopted.

In accordance with the present invention, there is provided a Raman optical amplification system in which WDM optical signals comprising two or more signal bands are transmitted in a transmission line, and in which a plurality of pumping lightwaves are introduced into said transmission line so that WDM optical signals in the shortest signal band are Raman-amplified by said plurality of pumping lightwaves wherein, the interval between the longest pumping wavelength and the next-longest pumping wavelength differs by 0.2 to 1.4 THZ in frequency.

The present invention is not restricted to the case where signal bands of WDM optical signals are divided into two or more as described above. The present invention also includes the case where the interval between the longest wavelength and the next-longest wavelength is set to differ by 0.2 to 1.4 THz in frequency and a wavelength longer than the longest pumping wavelength by 17 to 18 THz is included within a signal band.

FIRST EMBODIMENT OF THE INVENTION

An embodiment of the Raman optical amplification system of the present invention will be described below. In this Raman optical amplification system, the WDM optical signals output from the transmitter of a WDM transmission system and transmitted through an optical transmission line are of three bands: S-band, C-band, and L-band, the width of each transmission band being not less than 20 nm. At some middle point of the optical transmission line, there are arranged a repeater, a distributed Raman optical amplifier using an optical fiber, and a pumping light source for distributed amplification for supplying pumping lightwave to the distributed Raman optical amplifier.

The WDM optical signals of the three bands from the transmitter undergo optical amplification by the distributed Raman optical amplifier arranged at some middle point of the optical transmission line. In this case, a plurality of pumping lightwaves of different wavelengths are supplied from the pumping light source for distributed amplification to the distributed Raman optical amplifier, and the WDM optical signals undergo Raman amplification by the pumping lightwaves. The pumping by the pumping lightwaves from the pumping light source for distributed amplification may be forward pumping, backward pumping, or bidirectional pumping. Tables 1(a) and 1(b) show the relationship between the wavelength and power of the pumping lightwave for S-band in the prior-art technique. Of these, Table 1(a) is given in wavelength (nm), and Table 1(b) in frequency (THz).

TABLE 1(a)

| Pumping wavelength nm | Pumping power mW |
|---|---|
| 1376 | 170 |
| 1384 | 170 |
| 1391 | 140 |
| 1413 | 200 |

TABLE 1(b)

| Pumping frequency THz | Pumping power mW |
|---|---|
| 217.9 | 170 |
| 216.6 | 170 |
| 215.5 | 140 |
| 212.2 | 200 |

Figure 1:
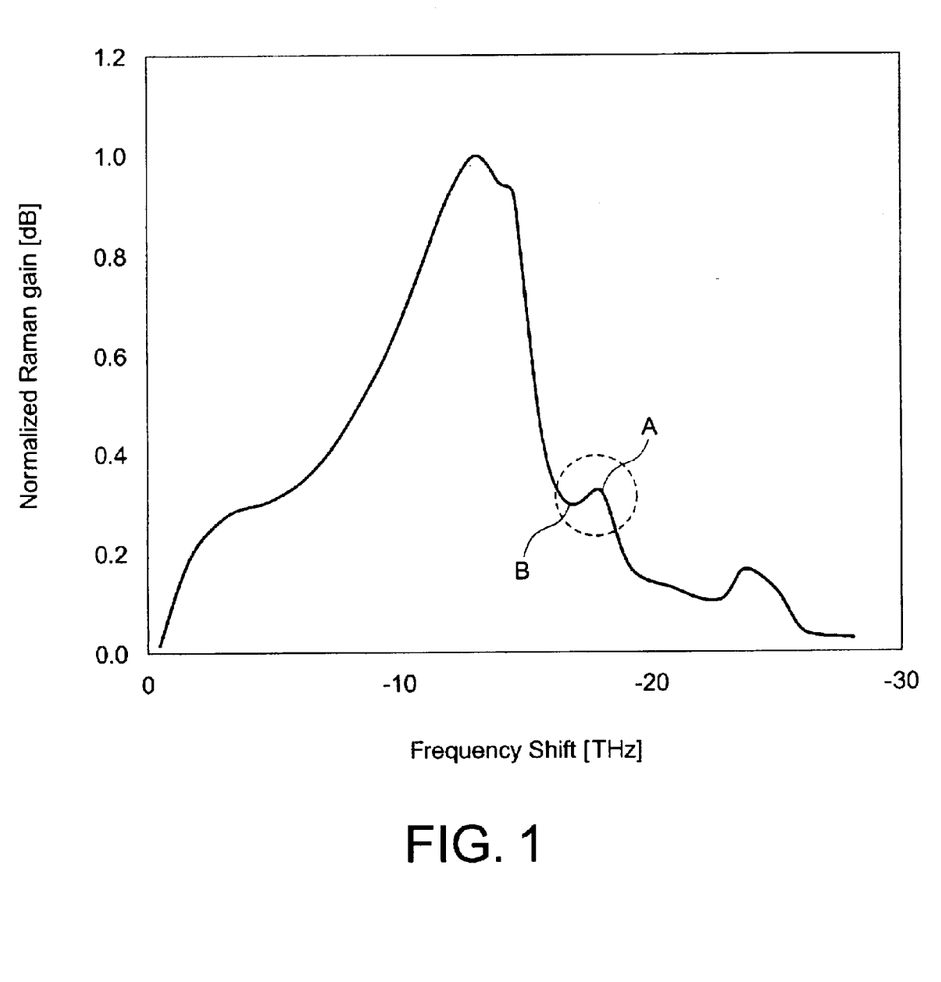
FIG. 1 is a Raman gain diagram illustrating how a ripple and a trough are generated in WDM output by using a plurality of pumping wavelengths output from a pumping light source for distributed amplification.
Figure 2:
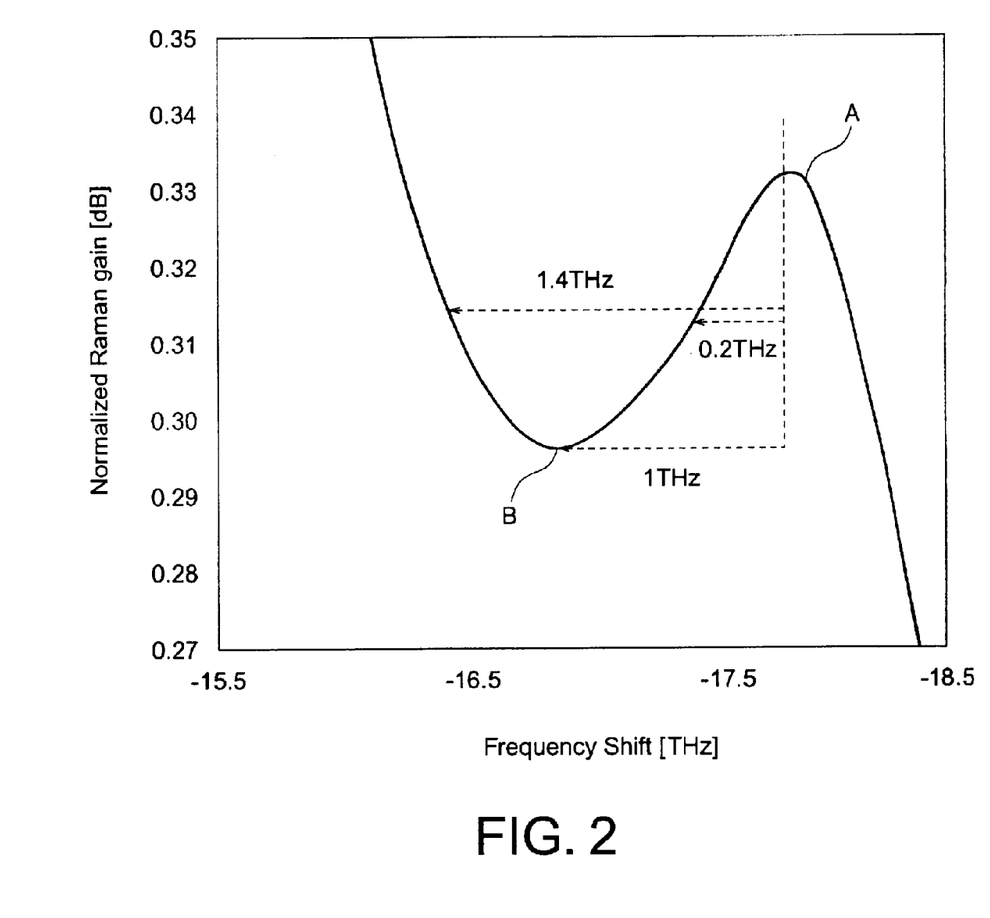
FIG. 2 is an enlarged view of the ripple and trough shown in FIG. 1.

In this case, of the pumping lightwaves for S-band on the shortest-wavelength-band side, the difference between the longest pumping wavelength and the next-longest pumping wavelength is 3.3 THz, with the result that a ripple A and a trough B as shown in FIG. 1 are generated in the output of the WDM optical signal. As shown in FIG. 2, the difference in frequency between the ripple A and the trough B is approximately 1 THz. In the Raman optical amplification system of the present invention, the ripple A is generated at (shifted to) the position (frequency) of the trough B, whereby the ripple A is eliminated (canceled) to flatten the WDM output. For this purpose, the plurality of pumping lightwaves emitted from the pumping light source for distributed amplification are set to have a wavelength relationship so that an interval between the longest pumping wavelength and the next-longest pumping wavelength differs by 0.2 to 1.4 THz in frequency. Tables 2(a) and 2(b) give specific wavelengths and powers. Table 2(a) is given in wavelength (nm), and Table 2(b) in frequency (THz). In this embodiment, the difference between the longest pumping wavelength and the next-longest pumping wavelength is 1.2 THz in frequency.

TABLE 2(a)

| Pumping wavelength nm | Pumping power mW |
|---|---|
| 1376 | 185 |
| 1384 | 170 |
| 1391 | 100 |
| 1406 | 100 |
| 1414 | 120 |

TABLE 2(b)

| Pumping frequency THz | Pumping power mW |
|---|---|
| 217.9 | 185 |
| 216.6 | 170 |
| 215.5 | 100 |
| 213.2 | 100 |
| 212.0 | 120 |

Figure 3:
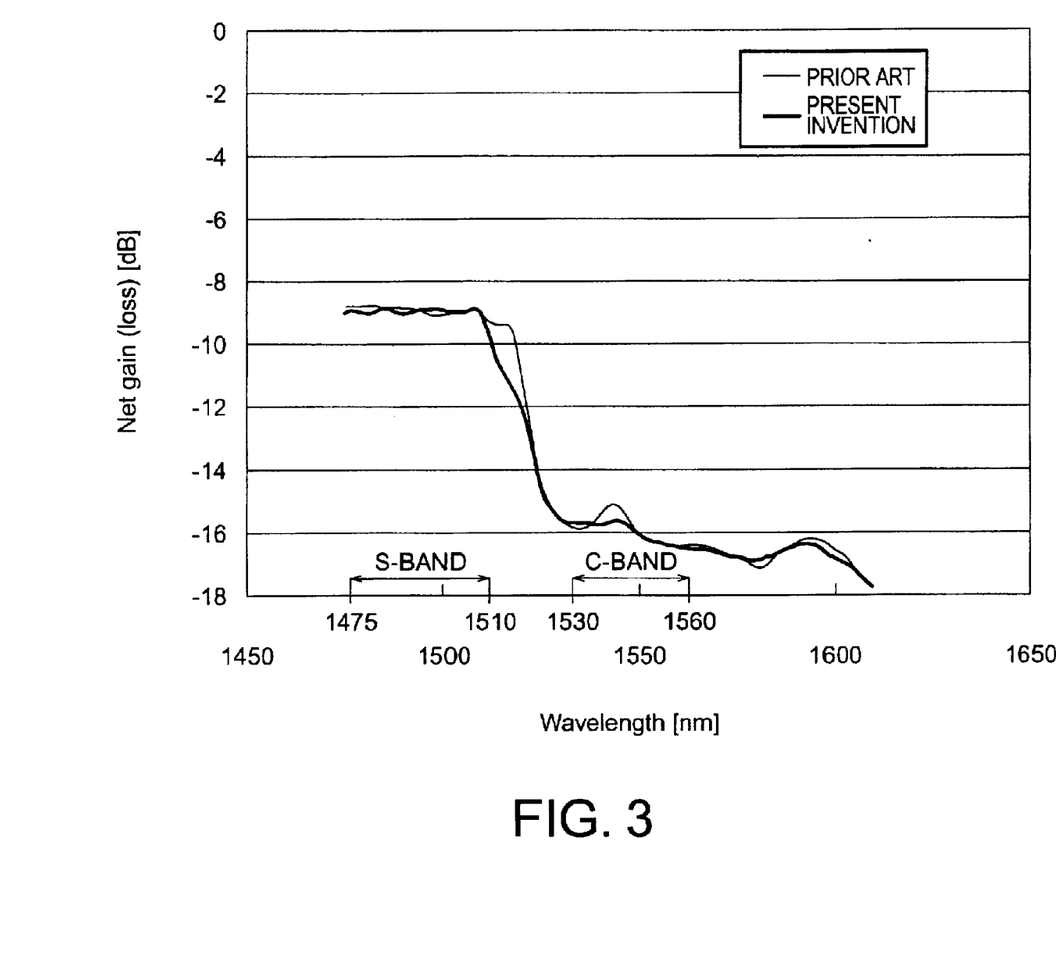
FIG. 3 is an explanatory diagram in which a WDM output amplified by using the pumping light source for Raman amplification of the present invention is compared with a WDM output obtained by a conventional technique.
Figure 4:
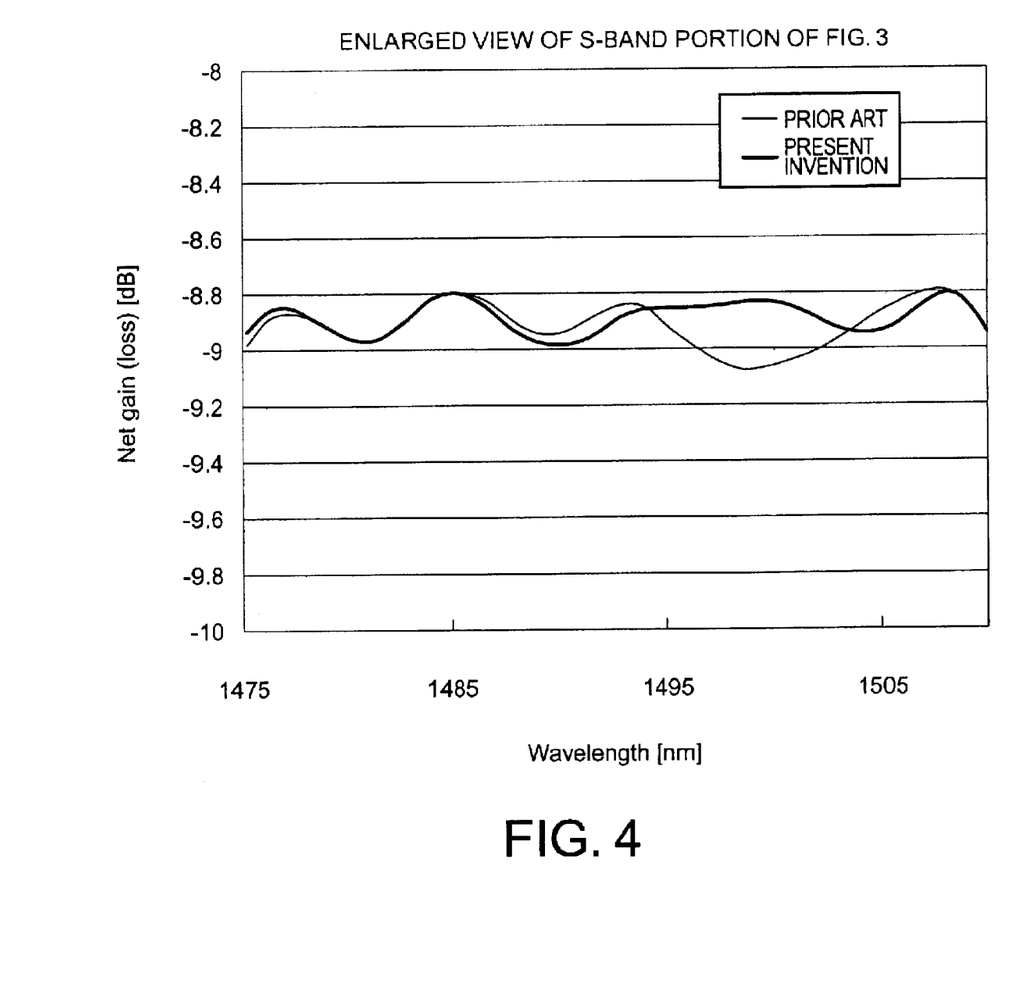
FIG. 4 is an enlarged view of the S-band portion of FIG. 3.
Figure 5:
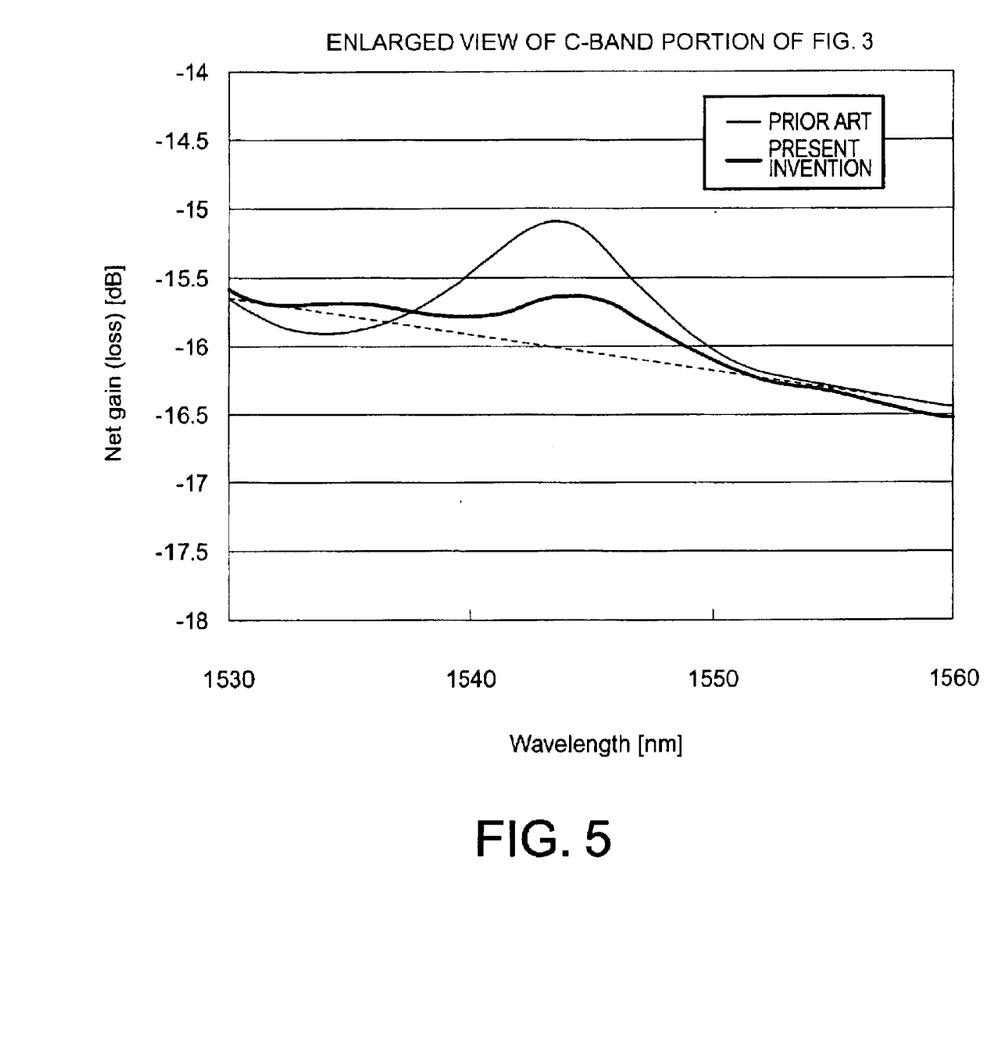
FIG. 5 is an enlarged view of the C-band portion of FIG. 3.

With this arrangement, the net gain (loss) of WDM optical signals of two or more signal bands transmitted through an optical transmission line is flattened as shown in FIG. 3, the S-band portion being flattened as shown in FIG. 4 and the C-band portion as shown in FIG. 5.

SECOND EMBODIMENT OF THE INVENTION

Regardless of the assumption of a first embodiment that a wavelength band between S-band and C-band (1510 to 1530 nm) is not used as a signal band, if there is provided an amplifier which realizes an amplification of these two bands at the same time as a discrete amplifier, these two bands can be used as one seamless band. Also in the above case, when a wavelength longer than the longest pumping wavelength for a distributed Raman amplification by 17 to 18 THz is included within a signal band, as the same as a first embodiment, a wavelength interval between the longest pumping wavelength and the next-longest wavelength is set to differ by 0.2 to 1.4 in frequency, whereby a ripple of WDM optical signals output from a distributed Raman amplifier may be diminished.

INDUSTRIAL AVAILABILITY

In accordance with the present invention, a plurality of pumping lightwaves emitted from a pumping light source for distributed amplification are set to have a wavelength relationship so that an interval between the longest pumping wavelength and the next-longest pumping wavelength differs by 0.2 to 1.4 THz in frequency, whereby combination is effected so that the concave and convex (the trough and ripple) in Raman gain of one wavelength pumping cancel with each other, and the ripples generated at the foot of two or more transmission bands are diminished, making it possible to obtain a WDM optical signal with a flat output level.

Even if signal bands of WDM optical signals are not divided into two or more as described above, when a wavelength band which is longer than the longest pumping wavelength by 17 to 18 THz is used as signal lightwaves, the ripples generated in a signal band are diminished by utilizing pumping lightwaves having the same wavelengths allocation, so that a WDM optical signal with a flat output level is obtained.

What is claimed is:

1. A Raman optical amplification system configured to amplify WDM optical signals in at least two different signal bands while the WDM optical signals are transmitted in an optical transmission media, comprising:

a pump source configured to produce a plurality of pumping lightwaves that are introduced into said optical transmission media, an interval between a longest pumping wavelength and a next-longest pumping wavelength of said plurality of pumping lightwaves differing in frequency in an inclusive range of 0.2 through 1.4 THz, wherein a subset of said WDM optical signals that are in a shortest signal band of said at least two different signal bands are Raman-amplified by said plurality of pumping lightwaves, a gain profile of a pump for said longest pumping wavelength having at least one of a ripple and a trough in another signal band, other than said shortest signal band, and a gain profile of a pump for said next-longest pumping wavelength having at least one of a trough and a ripple that is positioned at a wavelength so as to substantially cancel a local minimum or local maximum gain effect in the another signal band caused by said at least one of a ripple and a trough from said pump for said longest pumping wavelength.

2. A Raman optical amplification system according to claim 1, wherein:

said two different signal bands include at least two of S-band, C-band, and L-band.

3. A Raman optical amplification system according to claim 2, wherein:

said two different signal bands include all three of S-band, C-band, and L-band.

4. A Raman optical amplification system according to claim 1, wherein a bandwidth of each signal band of said two different signal bands is more than 20 nm.

5. A Raman optical amplification system according to claim 2, wherein a bandwidth of each signal band of said two different signal bands is more than 20 nm.

6. A Raman optical amplification system according to claim 3, wherein a bandwidth of each signal band of said two different signal bands is more than 20 nm.

7. A Raman optical amplification system comprising:

a pump source configured to introduce a plurality of pumping lightwaves into an optical transmission medium so as to amplify WDM optical signals by distributed Raman amplification, wherein said plurality of pumping lightwaves are set to have a wavelength relationship such that an interval between a longest pumping wavelength of said plurality of pumping wavelengths and a next-longest pumping wavelength of said plurality of pumping wavelengths differ in frequency by an amount that is in an inclusive range of 0.2 through 1.4 THz, a spectral occupancy of a portion of said WDM optical signals extends into a longer wavelength band that is longer than the longest pumping wavelength by at least 17 THz, a gain profile of a pump for said longest pumping wavelength having at least one of a ripple and a trough in the longer wavelength band, and a gain profile of a pump for said next-longest pumping wavelength having at least one of a trough and a ripple that is positioned at a wavelength so as to substantially cancel a local minimum or local maximum gain effect in the another signal band caused by said at least one of a ripple and a trough from said pump for said longest pumping wavelength.

8. The Raman optical amplification system of claim 7, wherein:

the spectral occupancy extends into the wavelength band that is longer than the longest pumping wavelength by between 17 THz and 18 THz.

9. The Raman optical amplification system of claim 7, wherein:

said portion of said spectral occupancy of the portion of WDM optical signals that extends into the wavelength band longer than the longest pumping wavelength includes at least a portion of at least one of S-band, C-band, and L-band.

* * * * *